Patented Nov. 13, 1951

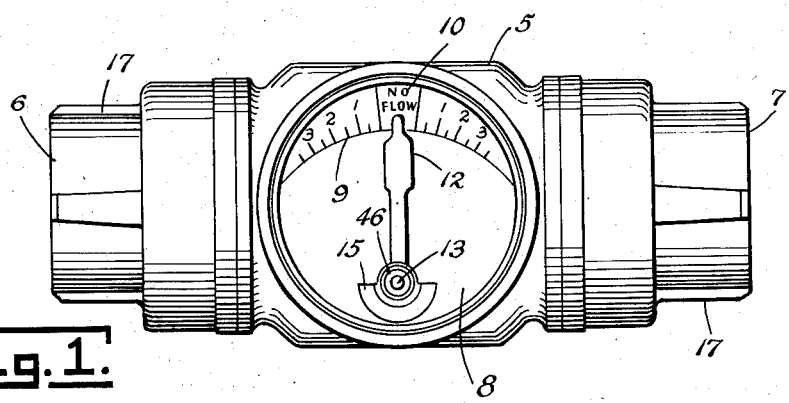
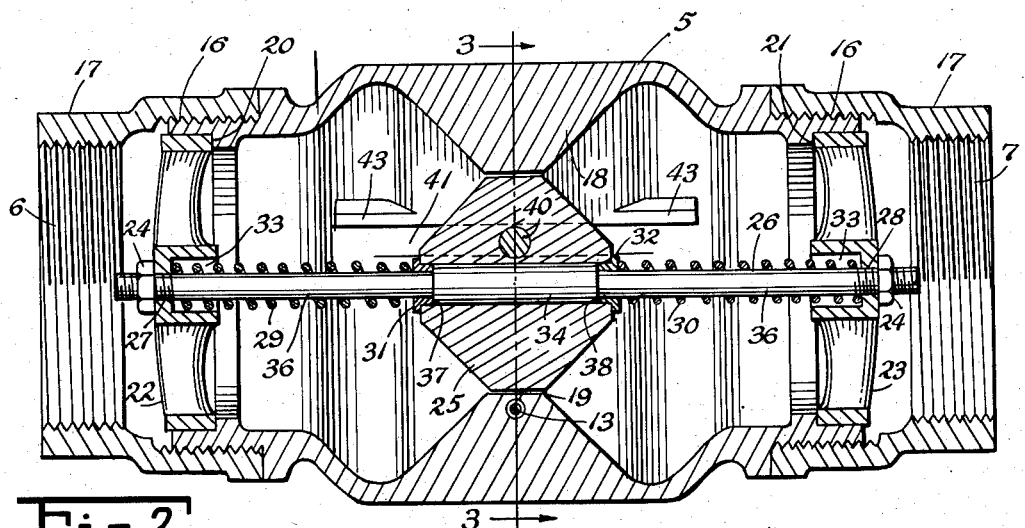
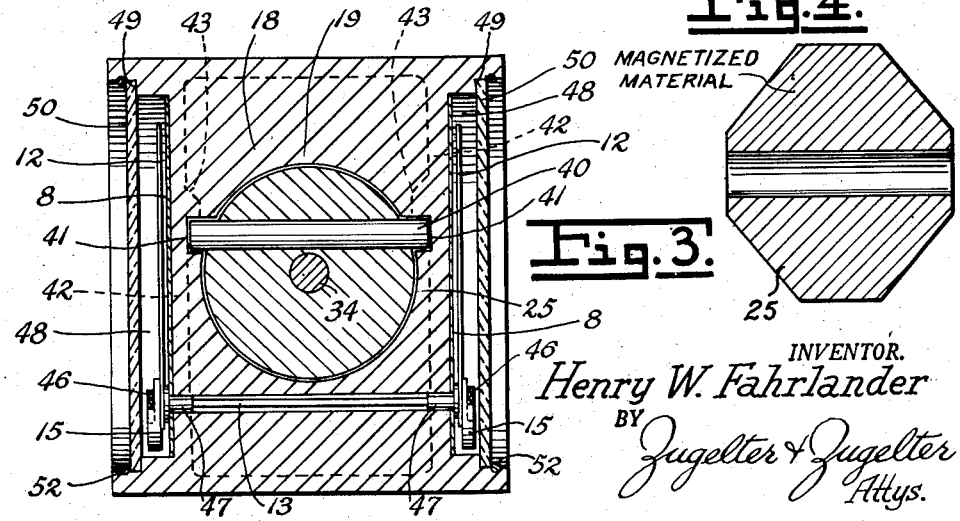

2,574,866

UNITED STATES PATENT OFFICE 2,574,866

MAGNETIC FLOW GAUGE

Henry W. Fahrlander, Hamilton, Ohio

Application February 25, 1947, Serial No. 730,774

5 Claims. (Cl. 73—210)

This invention relates to improvements in a gauge, or device for indicating rate of flow in a pipe conveying a fluid.

An object of the invention is to provide a flow gauge including means whereby a flow indicator exteriorly of the gauge, is actuated without physical connection with a shiftable actuating member within the path of moving fluid, thereby avoiding all possibility of leakage and the possibility of interference with free movement and clear visibility of the indicator.

Another object of the invention is to provide simple and highly serviceable means whereby the indicator element in a gauge of the character referred to, may be duplicated at opposite sides of the gauge without resort to delicate and complicated mechanism.

A further object is to provide in a device of the character stated, a highly serviceable and simplified means of indicating flow of fluid, said means being so designed and constructed as to save time and labor in initial assembly, and in servicing of the device when necessary.

Another object is to provide a flow gauge which is so constructed as to be capable of manufacture using materials and working parts which are acid-resistant and resistant to alkaline fluids, without requiring change in patterns and other expedients utilized in the fabrication and assembly of parts.

A further object is to provide a flow gauge constructed in such manner as to readily be applicable to pipes of various sizes and capacities.

The foregoing and other objects are attained by the means described herein and illustrated upon the accompanying drawing, in which:

Fig. 1 is a side elevational view of the improved flow gauge.

Fig. 2 is a longitudinal cross sectional view of the gauge.

Fig. 3 is a sectional view taken on line 3—3 of Fig. 2.

Fig. 4 is a sectional view of a modified form of plug.

The body of the gauge is indicated at 5 and is formed of non-magnetic material. The inlet and outlet ports are shown at 6 and 7. Since the gauge operates in either direction, each port may be inlet or outlet, depending on the direction of the flow of fluid through the gauge. A dial face 8 is calibrated as at 9, the calibrations being duplicated at the right and left of the central or neutral portion 10 of the dial. An indicator or pointer 12 is fixed to a rotatable shaft 13 extending through the body of the gauge. The indicator may preferably be counterweighted as at 15.

The hollow gauge body 5 is threaded at opposite ends, as at 16, Fig. 2, for the application thereon of suitable pipe fittings which may be in the form of reducers 17 for accommodating pipes of various sizes. The interior of the gauge body is provided with an intermediate transverse wall 18, apertured to provide a constricted opening 19 affording communication between the ports 6 and 7. Each port is provided with an annular shoulder 20, 21, said shoulders forming seats for the centrally apertured spiders 22—23. A centrally apertured shiftable plug or plunger 25, slidably supported on the rod 26 whose ends extend through the spider apertures 27—28, serves to substantially close the constricted body opening 19 when centered on said support rod. The support rod is fixed against displacement by the application of nuts 24 on the threaded ends of said rod, the nuts abutting the outer faces of the spiders 22, 23, thereby maintaining the spiders firmly in their seats 20—21.

The shiftable plug may be of any suitable configuration, such as biconical, spherical, or cylindrical, the first named being shown upon the drawings.

Means maintaining the plug 25 in normal closing relationship with the body opening 19 may be provided, such as the springs 29, 30, shown in Fig. 2. These springs yieldingly maintain the plug 25 in central position when not horizontally shifted or actuated by a flow of liquid through the gauge. As shown, the compression springs 29—30 are in encircling engagement with the rod 26, one spring being located on each side of the shiftable plug. As indicated, the inner ends of the springs abut the flanged bushings 31, 32, adjacent the ends of the plug 25, while the outer ends abut the spiders 22, 23, a recess 33 being provided in each spider to act as seats for the outer ends of the springs. The supporting rod 26 has an enlarged diameter 34 centrally thereof, which acts as a bearing for the shiftable plug 25, the length of the enlarged diameter being slightly less than the length of the plug. The flanged bushings are slidable on the reduced portions 35—36 of the support rod 26, their inward movement being limited by abutment against the shoulders 37—38 on the support rod 26. Thus it will be seen that as liquid enters the gauge through port 7, the pressure thereof acts to shift the plug 25 to the left, in the direction of the flow, against the compression of the spring 29, thereby to permit passage of liquid through the restricted opening 19, and out of port 6, while the other spring 30 exerts no pressure upon the plug 25, its force being limited by the flanged bushing 32 abutting the shoulder 38. The opposite action will result when the flow through the gauge is reversed. When the flow is shut off, the springs 29, 30, acting against each other, center the plug 25 in the gauge body 5, to substantially close the retricted opening 19.

The shiftable plug 25 may be fabricated from magnetized steel in order to actuate the indicator or pointer 12 at least a portion of which is composed of magnetic material as said plug is shifted upon the support rod 26. Other means for actuating the indicator may be provided. For instance, the plug 25 may be transversely bored to receive a magnetic bar or cylinder 40, the length of which approximates the width of the body interior, as shown upon the drawings. When the plug 25 carries a separate magnet, it is necessary to provide means for precluding rotation of the plug upon the support bar 26. Such means may be of any suitable character, an example of which is shown upon the drawing, in which a groove or track 41 is provided in opposite inner walls 42 of the body. As shown, the ends of the magnetic bar 40 ride in this groove as the plug 25 is longitudinally shifted upon flow of liquid through the gauge. Lugs 43 on each side of the wall 18 extend the groove beyond said wall.

A single indicator may be provided, although two indicators are preferred, one on each of opposite sides of the gauge, as shown. A rotatable indicator shaft 13 extends through the transverse wall 18 of the gauge body, said wall being suitably bored at right angles to the axis of the constricted opening 19 in non-communicating relation with the interior of the hollow body. The indicator shaft 13 may be of magnetic material to provide a magnetic flux circuit for the magnet 40. The projecting ends of the shaft 13 may be squared to receive the magnetizable indicator elements 12, said indicators being in position to be influenced in movement by the magnetic plug as said plug is longitudinally shifted on the support rod 26. In addition to being squared, the ends of shaft 13 may also be threaded to receive the knurled nuts 46, which secure the indicators 12 and the counterweights 15 to the shaft. In order to reduce friction in the rotating movements of the shaft 13, bearings 47 may be provided at each end of the transverse wall bore.

A recess 48 may be provided on opposite outer walls of the hollow gauge body for the application of the dial face 8, which may be a sheet or plate of any suitable material having thereon the calibrations 9 and other pertinent data. The recess 48 may be counterbored to provide an annular seat 49 for the transparent window 50, which serves to seal the dial and its associated elements against the entry of dust and other extraneous matter. Snap spring wires 52 disposed in cooperating circumferential grooves hold the windows firmly against displacement. It may here be noted that the indicator recess is entirely free of communication with the interior of the gauge body, so that no leakage is possible and the fluid is precluded from interfering with clear visibility of the calibrations 9.

Thus it will be understood that as liquid flows through the gauge, in either direction, the plug 25 is shifted in the direction of the flow, carrying with it the magnetic bar or cylinder 40 which acts upon the indicators 12 to move them synchronously in the direction of the flow. The extent of such movement is dependent on the rate of flow. The gauge is designed to operate as readily on extremely low flow as on high velocity. Because they are not subjected to any impact force, the indicator elements 12 cannot jam, being actuated only by magnetism. When the flow of liquid ceases, the springs 29, 30 centralize the plug 25, while the indicators assume the neutral or no-flow position.

It is to be understood that various structural modifications and changes may be made within the scope of the appended claims, without departing from the spirit of the invention.

What is claimed is:

1. A flow gauge comprising in combination, a hollow body of non-magnetic material having inlet and outlet ports, and an intermediate constricted opening affording communication between said ports, a shiftable plug and means mounting the plug for movement through said opening, yielding means normally maintaining the plug in substantial closing relationship within the opening, and responsive to a flow of fluid through the body from one port to the other tending to displace the plug from the opening and thereby increasing the flow therethrough, a pair of calibrated dials arranged upon opposite sides of the gauge body exteriorly thereof, a pair of movably mounted pointers at least a portion of which is composed of magnetic material each arranged to sweep one of the calibrated dials, and a magnet carried by the plug and operative directly upon the pointers for imparting shifting movements of the plug to said pointers.

2. A flow gauge comprising in combination, a hollow body of non-magnetic material having inlet and outlet ports, and an intermediate constricted opening affording communication between said ports, a shiftable plug and means mounting the plug for movement through said opening, yielding means normally maintaining the plug in substantial closing relationship within the opening, and responsive to a flow of fluid through the body from one port to the other tending to displace the plug from the opening and thereby increasing the flow therethrough, a pair of calibrated dials arranged upon opposite sides of the gauge body exteriorly thereof, a pair of movably mounted pointers composed of magnetic material and mounted on the ends of a common shaft composed of magnetic material journaled in said body, each pointer arranged to sweep one of the calibrated dials, a magnet carried by the plug and operative directly upon the pointers for imparting shifting movements of the plug to said pointers, so that said pointers and said magnetic shaft provide a magnetic flux path for said magnet.

3. A flow gauge comprising in combination, a hollow body of non-magnetic material having inlet and outlet ports, and an intermediate transverse wall apertured to provide a constricted opening affording communication between said ports, said wall being bored at right angles to the constricted opening in non-communicating relationship with the interior of the hollow body, a shiftable plug at least a portion of which is composed of magnetized material and means mounting the plug for movement through said opening, yielding means normally maintaining the plug in substantial closing relationship within the opening, and responsive to a flow of fluid through the ports tending to displace the plug from the opening, a shaft of magnetic material rotatable in the bore of the transverse wall of the body, said shaft having opposite ends projecting from the bore, and magnetizable indicator elements one fixed to each end of the rotatable shaft in position to be influenced by movements of the magnetized material of the plug.

4. A flow gauge comprising in combination, a hollow body of non-magnetic material having shouldered inlet and outlet ports, and an intermediate transverse wall apertured to provide a constricted opening affording communication between said ports, said wall being bored at right angles to the constricted opening in non-communicating relationship with the interior of the hollow body, an annular plug at least a portion of which is composed of magnetized material bored longitudinally and shiftable axially of the bore through said constricted opening, the plug when centered in said opening serving to substantially close the opening, a plug supporting rod accommodating the plug bore loosely for sliding movement of the plug axially along the rod, said rod having threaded opposite ends each furnished with a nut, a pair of centrally apertured spiders each abutting a shoulder of the hollow body at one of the ports, with the plug supporting rod ends projected through the spider apertures and held thereto by the nuts on the threaded ends of the rod, a pair of compression springs encircling the rod, one spring being located at one side of the plug, and the other being located at the opposite side of the plug, with the inner ends of the springs abutting the plug and the outer ends thereof each abutting a spider, a shaft rotatable in the bore of the transverse wall of the body, said shaft having opposite ends projecting from the bore, and magnetizable indicator elements one fixed to each end of the rotatable shaft in position to be influenced in movement by movements of the magnetized material of the plug.

5. A flow gauge comprising in combination, a hollow body of non-magnetic material having shouldered inlet and outlet ports, and an intermediate transverse wall apertured to provide a constricted opening affording communication between said ports, said wall being bored at right angles to the constricted opening in non-communicating relationship with the interior of the hollow body, an annular plug at least a portion of which is composed of magnetized material bored longitudinally and shiftable axially of the bore through said constricted opening, the plug when centered in said opening serving to substantially close the opening, a plug supporting rod accommodating the plug bore loosely for sliding movement of the plug axially along the rod, said rod having threaded opposite ends each furnished with a nut, a pair of centrally apertured spiders each abutting a shoulder of the hollow body at one of the ports, with the plug supporting rod ends projected through the spider apertures and held thereto by the nuts on the threaded ends of the rod, a pair of compression springs encircling the rod, one spring being located at one side of the plug, and the other being located at the opposite side of the plug, with the inner ends of the springs abutting the plug and the outer ends thereof each abutting a spider, a shaft rotatable in the bore of the transverse wall of the body, said shaft having an end projecting from the bore, and a magnetizable swinging indicator element mounted upon the end of the shaft in position to be influenced in its motion by movements of the magnetized material of the plug.

HENRY W. FAHRLANDER.

REFERENCES CITED

The following references are of record in the file of this patent:

UNITED STATES PATENTS

| Number | Name | Date |
| --- | --- | --- |
| 830,338 | Ledoux | Sept. 4, 1906 |
| 1,499,839 | Nicholson | July 1, 1924 |
| 1,631,746 | Luckey | June 7, 1927 |
| 1,986,986 | Swartwout | Jan. 8, 1935 |
| 2,076,263 | Blum | Apr. 6, 1937 |

FOREIGN PATENTS

| Number | Country | Date |
| --- | --- | --- |
| 193,955 | Switzerland | Feb. 1, 1938 |
| 309,559 | Great Britain | Mar. 27, 1930 |